United States Patent Office 3,344,022
Patented Sept. 26, 1967

3,344,022
METHOD OF TREATING CHRONIC RESPIRATORY DISEASE IN POULTRY
James David Johnston, Old Saybrook, Conn., assignor to Chas. Pfizer & Co., Inc., New York, N.Y., a corporation of Delaware
No Drawing. Filed June 29, 1965, Ser. No. 468,153
10 Claims. (Cl. 167—53.1)

This application is a continuation-in-part of U.S. application Ser. No. 393,371 as filed Aug. 31, 1964, and now abandoned.

This invention relates to processes for the control of chronic respiratory disease in poultry and for the promotion of growth and improvement of feed efficiency in animals. More particularly, it relates to the use of a series of quinoxaline-di-N-oxides as agents for the control of infectious sinusitis in turkeys, chronic respiratory and complicated chronic respiratory infections in poultry and for the promotion of weight gain and feed consumption of animals.

Mycoplasma, especially *M. gallisepticum*, *M. gallinarum*, *M. iners*, *M. synovaei*, and type N-PPLO are the primary agents responsible for chronic respiratory, and related, diseases of poultry, especially of chickens, and of infectious sinusitis of turkeys. The field condition commonly known as "air sac" disease, air sacculitis or complicated chronic respiratory disease is generally considered to involve Mycoplasma and secondary infections, especially those caused by coliform, Proteus and Micrococcus species. Throughout this application the term "chronic respiratory disease" also includes "complicated chronic respiratory disease," "infectious sinusitis," and related diseases.

The economic toll of avian diseases caused by Mycoplasma infections (formerly designated as PPLO or pleuropneumonia-like organisms) is astonishingly high. Crawley, et al. (Poultry Sci., 34, 707–16, 1955) in 1955 estimated that about 50% of the flocks in the United States and Canada are infected. The economic significance of such diseases has led to an extensive research on practical measures of immunization and effective therapeutic products. However, despite the availability of a number of compounds having therapeutic activity of one type or another, e.g., antibacterial, antiviral, the countermeasures developed to date have not been satisfactory. Various antibiotics and nitrofurans have been and are being used with some degree of success. However, no treatment has been developed which will satisfactorily prevent infection, eliminate the infection from a flock, prevent the shedding of the infectious organism in the eggs, and maintain normal or almost normal weight gain and feed consumption in the presence of such infection. Recent studies have shown a surprising increase in the incidence of organisms resistant to antibiotics. Sojka, et al. (Res. Vet. Sci. 2, 340, 1961) in a study on the in vitro sensitivity of *E. coli* strains isolated from pathological conditions in poultry demonstrated that the incidence of strains resistant to chlortetracycline and oxytetracycline isolated from field outbreaks of disease had increased markedly over the past four years. A similar study by Glantz (Cornell Vet., Oct. 1962) revealed that many strains of *E. coli* are resistant to antibiotics. As a result, the effectiveness of the presently available therapeutic measures is at best irregular.

It has now been found that a series of quinoxaline-di-N-oxides having the following formulae

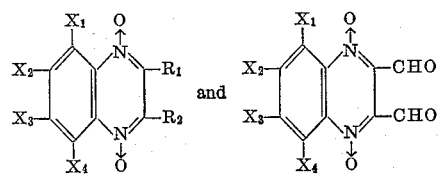

wherein $R_1$ is selected from the group consisting of hydrogen, alkyl of up to 10 carbon atoms, $\alpha$-hydroxy lower alkyl, $\alpha$-lower alkanoyloxy lower alkyl, and $\alpha$-lower alkoxy lower alkyl;

$R_2$ is selected from the group consisting of alkyl of up to 10 carbon atoms, lower alkanoyl, $\alpha$-hydroxy lower alkyl, $\alpha$-lower alkanoyloxy lower alkyl, and $\alpha$-lower alkoxy lower alkyl;

$X_1$, $X_2$, $X_3$ and $X_4$ are each selected from the group consisting of hydrogen and lower alkyl, is highly effective in maintaining weight gain and feed consumption of poultry in the presence of chronic respiratory disease and in controlling chronic respiratory disease, and in accelerating growth and improving feed efficiency of animals.

Of the lower alkanoyloxy, lower alkyl, lower alkanoyl and lower alkoxy groups those having from one to four carbon atoms in the alkanoyloxy, alkanoyl, alkyl and alkoxy moieties are preferred since they are easier to prepare.

These valuable products control not only the secondary infections associated with chronic respiratory disease but are surprisingly and unexpectedly effective against *Mycoplasma gallisepticum*, the primary organism believed responsible for the disease. Additionally, and highly important from an economic standpoint, they promote significant growth and improve feed efficiency of diseased and healthy poultry and of other economically important animals. Many of these compounds exhibit useful anthelmintic activity.

Francis et al. (Biochem. J., 63, 455–7, 1956) reported that several 1,4-quinoxaline-di-N-oxides show activity either in vitro or in infections in mice. They observed that 2,3 - dimethyl - quinoxaline-di-N-oxide was highly effective in mice versus *Salmonella dublin* but had little activity in vitro. Subsequent investigation showed 2-hydroxymethyl-3-methyl-quinoxaline-di-N-oxide, a metabolite of 2,3-dimethyl-quinoxaline-di-N-oxide, to be the active agent.

The gram-negative antibacterial activity of several quinoxaline-di-N-oxides bearing 2-alkyl or 2,3-dialkyl groups has been described by Lundquist et al. U.S. Patent 2,626,259, issued Jan.20, 1953, and by Wiedling, Acta Pathol, et. Microbiol. Scand. 22, 379–91 (1945). McIlwain, J. Chem. Soc. 322 (1943) and King et al., J. Chem. Soc., 3012 (1949), disclose the antibacterial activity of 2-methyl-3-n-amylquinoxaline-di-N-oxide and of several 6-substituted quinoxaline - di - N-oxides, respectively. Hurst et al., Brit. J. Pharmacol., 8, 297 (1953) report on the antiviral properties of quinoxaline-di-N-oxide and various derivatives thereof against the largest viruses of the psittacosis-lymphogranuloma group and note that toxic side reactions preclude their use in man. Hurst et al. (loc-cit) report that few of the products were active against the virus (lymphogranuloma) in the chick embryo.

Despite the early disclosure of the antibacterial properties of several quinoxaline-di-N-oxides and the concerted efforts to develop effective therapeutic measures against chronic respiratory diseases, the efficacy of these compounds for the control of chronic respiratory disease was not recognized until the present invention.

The herein described quinoxaline-di-N-oxides are particularly effective in the control (prophylaxis and treatment) of chronic respiratory disease in poultry, especially in chickens and turkeys and in maintaining weight gain and feed consumption in the presence, and in the absence, of such infection. For this purpose and for the other purposes described herein, these valuable products can be administered orally or parenterally. Subcutaneous and intramuscular injections are the preferred methods of parenteral injection for several reasons; simplicity, convenience and the compounds appear less toxic. According to the present invention the compounds described herein are administered orally or parenterally, e.g., by subcutaneous or intramuscular injection, to poultry in a dosage of from about 1 mg./kg. to about 100 mg./kg. of body weight for the control of chronic respiratory disease. When administered orally it is preferred to use a dosage of from about 1 mg./kg. to about 60 mg./kg. of body weight. For parenteral administration dosages of from about 10 mg./kg. to about 100 mg./kg. of body weight are preferred. These compounds can be used either in the form of solutions or suspensions, aqueous or non-aqueous. When administered parenterally, a single dose is generally sufficient but, in the event multiple doses are employed, the dosage is repeated at a suitable interval, e.g., weekly, monthly. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as hyaluronidase (spreading factor), local anesthetics and inorganic salts to afford desirable pharmacological properties.

In general, no tissue irritation results from the subcutaneous injection of these compounds. However, as a precaution against possible irritation and to facilitate absorption, parenteral administration of these compounds in combination with hyaluronidase can be employed. An increase in the rate of absorption of the drug is observed and the occasional discomfort on injection is greatly reduced, if not completely eliminated. Hyaluronidase levels of at least about 150 (U.S.P.) units are very effective in this respect. Higher or lower levels can, of course, be used but 150 units per dose appears to give consistently good results as evidenced by the absence of edema and the general behavior of the poultry following injection of the drug preparation.

Dry mixtures containing the active ingredients together with salt (sodium chloride) and/or buffering agents or local anesthetics are prepared for extemporaneous use. A concentration of active ingredient in such mixtures of at least about 50% is useful.

According to a further modification of the present invention, these valuable compounds are administered to poultry by the oral route in a dosage of from about 1 to about 60 mg./kg. of body weight. This can be achieved by a number of methods including mixing with the feed, the preparation of concentrates, dosage unit formulations such as capsules, tablets, liquid mixtures and solutions, or they can be administered in admixture with minerals such as sodium chloride which are frequently fed to poultry as a supplement. Dilute solutions or suspensions, e.g., a 0.1% solution, can be supplied for drinking purposes.

For prophylactic use, about 10 to about 100 mg./kg. body weight daily is administered. The above methods of administration are suitable although administration in the animal's food, water, or mineral mixture is more convenient.

The unique feed compositions of this invention are found to be particularly valuable for use with poultry and especially for poultry infected with chronic respiratory disease. A type of conventional feed material which may be employed is recommended to contain roughly between 50% and 80% of grains, between 0% and 10% animal protein, between 5% and 30% vegetable protein, between 2% and 4% minerals together with supplemental vitaminaceous sources. When a feed containing a major proportion of these substances and a minor proportion of one of the herein mentioned drugs is employed, the poultry shows a marked improvement, if not complete recovery, over the infection and reach the desirable weight in a shorter period of time than usual with a markedly greater feed efficiency. It should be noted that these valuable products eliminate, or at least minimize, the economic losses normally associated with chronic respiratory disease.

It has now been found that the addition of a low level of one or more of the herein described quinoxaline-di-N-oxides to the diet of animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improved feed efficiency. Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals and other factors known to be required for the maximum healthy growth of such animals. The animals thus attain market size sooner and on less feed.

The herein described feed compositions have been found to be particularly valuable and outstanding in the case of such animals as poultry, rats, hogs, swine, lambs, cattle, and the like. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds.

The resulting new feed compositions have marked effects on the rate of growth and feed efficiency. Feed efficiency, an extremely important economic factor in raising animals, may be defined as the number of pounds of feed required to produce a pound gain in weight. The novel feed supplements of this invention permit the use of higher energy, higher protein diets to obtain improved feed/gain ratios and the use of feedstuffs that at present are not utilized efficiently. Simply stated, the compositions of this invention when fed to animals are more efficiently converted to animal body weight than prior art compositions. Any animal feed composition may be prepared to comprise the usual nutritional balance of energy, proteins, minerals, and vitamins together with one or more of the quinoxaline-di-N-oxides described above. Some of the various components are commonly grains such as ground grain, and grain by-products; animal protein substances, such as meat, and fish by-products; vitaminaceous mixtures, e.g., vitamin A and D mixtures, riboflavin supplements and other vitamin B complexes; and bone meal, limestone, and other inorganic compounds to provide minerals.

The relative proportions of the quinoxaline-di-N-oxides in feeds and feed concentrates may vary somewhat, depending upon the compound, the feed with which they are employed and the animal consuming the same. These substances are advantageously combined in such relative proportions with edible carriers to provide concentrates which may readily be blended with standard nutritionally balanced feeds or which may be used themselves as an adjunct to the normal feedings.

Dry pre-mixes containing these compounds are prepared containing from 0.10 to about 10% of the active ingredient mixed with salt (sodium chloride) and other minerals which it is desired to incorporate into the poultry ration. This can then be fed on an ad libitum basis by adjusting the proportion of active ingredient in the mixture to the average daily consumption per bird so as to provide the proper daily dose as specified above. If prepared feed supplements are employed, the material can be administered in admixture with the feed. Again a concentration range of about 0.10 to 10% of the drug in the feed is employed. However, higher proportions can be satisfactorily employed depending upon the palatability of the product to the poultry. This can be readily determined by simple experimentation. It is sometimes convenient to mix the daily dose with only a portion of the average daily allotment to insure complete consumption of the dose. The balance of the daily feed supplement can then be fed after consumption of the medicated portion in the usual fashion. These methods are particularly useful for prophylactic treatment, but similar compositions can be employed for therapeutic use. Concentrations of drug in the feed or mineral mixture up to from 0.1 to 10%, depending again upon the palatability of the material, are sometimes useful.

In the preparation of concentrates a wide variety of carriers may be employed containing the aforesaid drugs. Suitable carriers include the following: soybean oil meal, corn gluten meal, cotton seed oil meal, sunflower seed meal, linseed oil meal, cornmeal, limestone and corncob meal. The carrier facilitates uniform distribution of the active materials in the finished feed with which the concentrate is blended. This is especially important because only a small proportion of these potent materials are required. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., premixes, suitable for blending by feed manufacturers to produce finished feeds or concentrates of lower potency, the drug content may range from about 0.1 g. to 50 g. per pound of concentrate. A particularly useful concentrate is provided by blending 2 g. of drug with 1 pound of limestone or 1 pound of limestone-soybean oil meal (1:1). Other dietary supplements, such as vitamins, minerals, etc., may be added to the concentrates in the appropriate circumstances.

The high potency concentrates may be blended by the feed manufacturer with proteinaceous carriers, such as soybean oil meal, to produce concentrated supplements which are suitable for direct feeding to animals. In such instances the animals are permitted to consume the usual diet of corn, barley and other fibrous grains and the like. The proportion of the drug in these supplements may vary from about 0.1 to 10 g. per pound of supplement.

The concentrates described may also be added to animal feeds to produce a nutritionally balanced, finished feed containing from about 10 to about 125 g. of the quinoxaline-di-N-oxide per ton of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran, and dried molasses. Bone meal, limestone, iodized salt and trace minerals are frequently added to supply the necessary minerals, and urea to provide additional nitrogen.

As is well known to those skilled in the art, the types of diets are extremely variable depending upon the purpose, type of feeding operation, species, etc. Specific diets for various purposes are listed by Morrison in the appendix of "Feeds and Feeding," the Morrison Publishing Company, Clinton, Iowa, 1959.

In the case of non-ruminant animals, such as hogs, a suitable feed may contain from about 50 to 80% of grains, 3 to 20% animal protein, 5 to 30% vegetable protein, 2 to 4% of minerals, together with supplementary vitaminaceous sources.

The valuable compounds described herein, many of which are new, are prepared by known methods, principally by condensation of the appropriate o-phenylenediamine with the desired 1,2-dicarbonyl compound or the monoxime or bisulfite addition compound thereof. Water, alcohols, acetic acid or dioxane serve as solvents. The condensations are conducted at temperatures of from about 0° C. to the boiling point of the solvent. Alternatively, $\epsilon$-haloketones can be used in place of the 1,2-dicarbonyl compounds. Certain 2,3-dialkyl derivatives, e.g., the 2,3-dimethyl- and 2,3-dipropyl-, can be prepared by reaction of a 2,3-dichloroquinoxaline with the desired alkyl magnesium iodide in a 1 to 2 molar ratio. The lower alkanoyl derivatives are conveniently prepared by oxidation of the corresponding alkyl derivatives with selenium dioxide; e.g., methyl is oxidized to formyl; ethyl to acetyl, propyl to propionyl, etc. Other methods are described by Pratt in "Heterocyclic Compounds," edited by Elderfield, vol. 6, pp. 457–469, J. Wiley & Sons, Inc., N.Y. (1957).

The quinoxalines thus obtained are then oxidized by means of peracids, e.g., hydrogen peroxide in glacial acetic acid, peracetic acid, m-chloroperbenzoic acid, performic acid or monoperphthalic acid, to the di-N-oxides.

In still another method, useful in preparing the $\alpha$-hydroxy lower alkyl compounds and the alkanoyloxy and alkoxy derivatives thereof, the appropriate 2-formyl quinoxaline is subjected to a Grignard reaction and the resulting $\alpha$-hydroxy lower alkyl compound oxidized by means of a per acid to the corresponding di-N-oxide. A further method for producing the $\alpha$-hydroxy lower alkyl compounds comprises conversion of a 2-lower alkyl or 2,3-di-lower alkyl quinoxaline to the mono-N-oxide followed by treatment of the N-oxide with a lower alkanoic acid anhydride to produce the corresponding 2-($\alpha$-lower alkanoyloxy) compound. Oxidation by means of a per acid followed by acid hydrolysis gives the desired 2-($\alpha$- hydroxy lower alkyl)quinoxaline-di-N-oxide. The α-(lower alkoxy lower alkyl) derivatives are produced by standard methods of ether formation.

The 2,3-di-(α-hydroxy lower alkyl)quinoxaline-di-N-oxides are prepared in like manner from the precursor 2,3-di(lower alkyl)-di-N-oxides.

Additionally, many of the compounds described herein have unexpectedly significant activity in vivo against a variety of small and medium viruses such as the myxoviruses and especially against influenza PR8 and BGL. Care should, of course, be exercised when using these compounds for this purpose. Therapeutic dosages and regimens commensurate with the therapeutic index of these compounds can be administered without substantial adverse effect.

When used for the purposes described herein the quinoxaline-di-N-oxides can, of course, be used in combination with other known drugs such as the tetracycline-type antibiotics, carbomycin, neomycin, bacitracin and tylosin.

The following examples are given solely for the purpose of illustration and are not to be construed as limitations of this invention, many variations of which are possible without departing from the spirit or scope thereof.

PREPARATION A

*2-lower alkanoyl quinoxaline-di-N-oxides*

2,3-dimethyl quinoxaline-di-N-oxide (20 g.) is dissolved in ethyl acetate (250 ml.), selenium dioxide (15 g.) added, and the mixture refluxed and stirred for 90 minutes. The ethyl acetate is removed by vacuum distillation and the residue triturated with methylene chloride. Concentration of the methylene chloride solution yields crude 2-formyl-3-methyl quinoxaline-di-N-oxide (Circa 15 g.). Recrystallization from ethyl acetate/methylene chloride mixture yields the pure product; M.P. 186–187° C. (decom.).

*Analysis.*—Calcd. for $C_{10}H_8O_3N_2$: C, 58.82; H, 3.95; N, 13.72. Found: C, 58.77; H, 3.93; N, 13.78.

PREPARATION B

*2-(α-hydroxy lower alkyl)quinoxaline-di-N-oxides*

2-formyl-3-(lower alkyl)quinoxaline (0.5 mole) (a product obtained from the selenium dioxide oxidation of 2-methyl-3-alkyl quinoxaline) in diethyl ether is treated with a solution of methyl magnesium bromide (1 mole) in diethyl ether. After stirring for one hour at room temperature the mixture is treated with a saturated solution of ammonium chloride. The product, 2-(α-hydroxyethyl)-3-(lower alkyl)quinoxaline, isolated by removal of the solvent, is crystallized from chloroform/hexane.

2-(α-hydroxyethyl)-3-(lower alkyl)quinoxaline (0.25 mole) in chloroform is treated with m-chloroperbenzoic acid (0.5 mole) and the mixture allowed to stand at room temperature for 3 days. The precipitated m-chlorobenzoic acid is filtered off and the chloroform solution washed with saturated sodium bicarbonate solution. The product 2-(α - hydroxyethyl) - 3-alkylquinoxaline-di-N-oxide obtained by removal of the chloroform, is crystallized from acetone.

PREPARATION C

*2-(α-hydroxy lower alkyl)quinoxaline-di-N-oxides*

2,3-di-lower alkylquinoxaline (1 mole) in chloroform is treated with m-chloroperbenzoic acid (1 mole) for 3 days at room temperature. The precipitated m-chlorobenzoic acid is filtered off and the chloroform solution washed with saturated sodium bicarbonate solution. The chloroform solution is dried ($Na_2SO_4$) and concentrated under vacuum. The product, 2,3-di-lower alkylquinoxaline mono-N-oxide, crystallizes from chloroform/hexane.

2,3-di-lower alkylquinoxaline mono-N-oxide (0.5 mole) in excess acetic anhydride is refluxed for 30 minutes and then the acetic anhydride removed in vacuo. The solid residue is purified by recrystallization from ether/hexane to give pure 2-(α-acetoxy lower alkyl)-3-lower alkylquinoxaline.

2-(α-acetoxy lower alkyl)-3-lower alkylquinoxaline (0.25 mole) in chloroform is treated with m-chloroperbenzoic acid (0.5 mole) as described in Preparation B to give 2-(α-acetoxy lower alkyl)-3-lower alkylquinoxaline-di-N-oxide as yellow crystals from chloroform/hexane.

2-(α-acetoxy lower alkyl)-3-lower alkylquinoxaline-di-N-oxide (0.2 mole) is allowed to stand in a mixture of methanol (3 liters) and 20% $H_2SO_4$ (500 ml.) for 8 days. The product, 2-(α-hydroxy lower alkyl)-3-lower alkylquinoxaline-di-N-oxide, which deposits as yellow needles, is separated and purified by recrystallization from chloroform/hexane.

PREPARATION D

*2-(α-lower alkoxy lower alkyl)quinoxaline-di-N-oxides*

2-(α-hydroxy lower alkyl)-3-lower alkylquinoxaline (0.25 mole) in dimethylformamide is treated with sodium hydride (0.25 mole, 50% suspension in oil) to give a solution of the sodium salt of 2-(α-hydroxy lower alkyl)-3-lower alkyl quinoxaline which is reacted at room temperature with a slight excess of dimethyl sulfate (0.3 mole). The product is isolated by pouring the reaction mixture into excess water and extracting with chloroform. Removal of the chloroform yields a solid residue which crystallizes from acetone/hexane.

2-(α-methoxy lower alkyl)-3-lower alkyl quinoxaline-di-N-oxide is obtained by oxidizing the above product with m-chloroperbenzoic acid in chloroform solution as described in Preparation B.

PREPARATION E

*2-(α-lower alkoxy lower alkyl)quinoxaline-di-N-oxides*

2,3-di-(α-hydroxy lower alkyl)quinoxaline is prepared by rearrangement and hydrolysis of 2,3-di-lower alkyl quinoxaline-di-N-oxide in a manner similar to that used in the preparation of 2-(α-hydroxy lower alkyl)-3-lower alkyl quinoxaline (Preparation C).

2,3-di-(α-hydroxy lower alkyl)quinoxaline (0.25 mole) in dimethyl formamide solution is treated with sodium hydride (0.5 mole, 50% suspension in oil) and the solution of the disodium salt is reacted with the appropriate lower alkyl bromide (0.55 mole). The solution is allowed to stand at room temperature until neutral to damp litmus paper then poured into excess water. The product is obtained by extracting with chloroform. Removal of the solvent yields a solid residue with crystallizes from acetone/hexane to yield the 2,3-di-(α-lower alkoxy lower alkyl)quinoxaline.

The di-N-oxide of this product is obtained by oxidation with m-chloroperbenzoic acid in chloroform solution according to Preparation B.

EXAMPLE I

Five-week old chickens are infected with coliform air sacculitis by injecting 1.0 ml. of a 24-hour broth culture containing 2 different antibiotic (tetracycline) resistant, avian pathogenic strains of *E. coli* into the left posterior thoracic air sac. The quinoxaline-di-N-oxide test compound is administered in the feed, the medicated ration being fed for a 5-day period starting 2 days prior to the coliform injection. The feed is tendered to the birds for imbition ad. libitum. Twenty-five hundred grams of medicated feed is provided per 10 birds. When this is all consumed, non-medicated basal feed is given to the end of the trial.

The chickens are checked as to mortality, weight change, feed consumption pre- and post-injection and, after sacrifice 3 days post-injection, for air sac lesions.

The latter are rated as to severity of the lesions using a 1- through 4-scale. The results of several such tests are tabulated in Table I.

The effectiveness of the tested quinoxaline di-N-oxides in reducing lesion scores and mortality, in maintaining post-injection (of avian pathogenic *E. coli*) feed consumption and increasing body weights is evident from Table I.

The birds on 2,3-dimethyl quinoxaline-di-N-oxide treatment did not appear sick at any time and consumed all their medicated feed by the end of the fourth day of treatment.

The birds under treatment with the other compounds were slightly depressed on the first day post-injection but appeared normal from the second day post-injection.

The compounds are used at levels of 0.01, 0.025, 0.05% in the feed.

2-ethyl-3-(α-hydroxyethyl)
2-amyl-3-methyl
2,3-diethyl
2-ethyl
2-ethyl-3-methyl
2-ethyl-3-n-propyl
2-methyl-3-isopropyl
2,3-di-n-propyl
2-methyl-3-n-propyl
2,3,6-trimethyl
2,3,6,7-tetramethyl
2,6,7-trimethyl

TABLE I.—ORAL ADMINISTRATION

| Test No. | Quinoxaline di-N-oxide | Percent in Feed | No. of Birds | Replicates | Lesion Score a | Percent Deaths | Feed Consumption/Lot | | | Wt. (g.)/Bird Gain b (g.) |
|---|---|---|---|---|---|---|---|---|---|---|
| | | | | | | | Pre-Inj. | Post-Inj. | Total | |
| A-1 | Infected control | | 10 | 6 | 3.88 | 13.3 | 1,450.2 | 327.0 | 1,777.2 | c 25.2 |
| 2 | 2,3-dimethyl | 0.05 | 10 | 3 | 1.23 | 0.0 | 1,408.3 | 1,429.7 | 2,838.0 | 170.9 |
| 3 | 2,3-dihydroxymethyl | 0.05 | 10 | 3 | 1.70 | 0.0 | 1,413.0 | 1,095.3 | 2,508.3 | 144.4 |
| B-1 | Infected control | | 10 | 3 | 3.97 | 16.7 | 1,360 | 281 | 1,641 | 5.53 |
| 2 | 2,3-dimethyl | 0.05 | 10 | 3 | 1.43 | 0.0 | 1,514 | 1,206 | 2,720 | 137.8 |
| 3 | do | 0.025 | 10 | 3 | 2.77 | 6.7 | 1,391 | 1,005 | 2,396 | 101.6 |
| 4 | 2,3-dihydroxymethyl | 0.05 | 10 | 3 | 2.17 | 0.0 | 1,381 | 1,024 | 2,405 | 117.1 |
| 5 | N-(5-nitro-2-furfurylidene)-3-amino | 0.05 | 10 | 3 | 3.93 | 16.7 | 1,119 | 236 | 1,355 | 13.2 |
| 6 | 2-oxazolidone | 0.025 | 10 | 3 | 3.97 | 16.7 | 1,197 | 318 | 1,515 | 19.2 |
| C-1 | Infected control d | | 10 | 5 | 3.82 | 6.0 | 1,426 | 690 | 2,116 | 69.4 |
| 2 | 2,3-dimethyl | 0.05 | 10 | 1 | 0.9 | 0.0 | 1,390 | 1,590 | 2,980 | 183.5 |
| 3 | 2,3-dihydroxymethyl | 0.05 | 10 | 1 | 1.8 | 0.0 | 1,202 | 1,098 | 2,300 | 126.5 |
| 4 | 2-formyl | 0.05 | 10 | 1 | 1.3 | 0.0 | 1,301 | 1,175 | 2,476 | 125.5 |
| D-1 | Infected Control d | | 10 | 6 | 3.33 | 3.3 | 1,281 | 822 | 2,103 | 80.7 |
| 2 | 2,3-dimethyl | 0.05 | 10 | 1 | 0.5 | 0.0 | 1,175 | 1,652 | 2,827 | 183.1 |
| 3 | 2,3-dihydroxymethyl | 0.05 | 10 | 1 | 1.5 | 0.0 | 1,076 | 1,373 | 2,449 | 168.2 |
| 4 | 2-formyl | 0.05 | 10 | 1 | 2.2 | 0.0 | 1,219 | 1,514 | 2,733 | 176.5 |
| 5 | 2-methyl-3-hydroxymethyl | 0.05 | 10 | 1 | 1.1 | 0.0 | 1,218 | 1,616 | 2,834 | 207.2 |
| 6 | 2-methyl | 0.05 | 10 | 1 | 1.5 | 0.0 | 1,269 | 1,231 | 2,500 | 121.6 |
| 7 | 2-methyl-3-acetoxymethyl | 0.05 | 10 | 1 | 2.2 | 0.0 | 1,322 | 1,162 | 1,484 | 128.1 |
| E-1 | Infected control | | 10 | 1 | 3.90 | 26.0 | 1,236 | 293 | 1,529 | 4.78 |
| 2 | 2,3-dimethyl | 0.10 | 10 | 1 | 0.50 | 0.0 | 949 | 1,056 | 2,005 | 117.6 |
| 3 | 2,3-dihydroxymethyl | 0.10 | 10 | 1 | 2.20 | 3.0 | 985 | 623 | 1,608 | 101.7 | a Lesion score = $\frac{(\text{No. of birds} \times \text{lesion scale rating})}{\text{Total No. of birds}}$ b Weight gain over the average starting weight.
c Several of the birds lost weight.
d Inoculated with 0.5 ml. of broth culture containing avian pathogenic *E. coli* strains.

The comparative data presented in test B adequately demonstrate the superiority of 2,3-dimethyl- and 2,3-dihydroxymethylquinoxaline-di-N-oxide over N-(5-nitro-2-furfurylidene)-3-amino-2-oxazolidone, a product currently used for the treatment of chronic respiratory disease.

EXAMPLE II

Five-week old chickens are inoculated into the left posterior thoracic air sac with 0.5 ml. of a 24-hour broth culture containing 2 different antibiotic (tetracycline) resistant, avian pathogenic strains of *E. coli*. The test compound is administered by subcutaneous injection of an aqueous solution into the upper cervical region at the time of infection. Observations on mortality, feed consumption post-injection, weight change and air sac lesion scores are presented below in Table II. Ten birds are used for each test.

Effective control of the coliform infection is evident from this data, particularly at dosage levels of approximately 10 mg./kg. body weight and higher. No toxicity was noted at the higher levels of about 40 mg./kg. body weight. No tissue irritation was observed on subcutaneous injection of these compounds.

EXAMPLE III

The procedure of Example I is repeated, 5-week-old chickens being used in all tests, using the following quinoxaline-di-N-oxides. Ten birds are used for each test.

2-decyl
2,3-dimethyl-6,7-di-n-butyl
2,3-di-n-octyl
2,3-diamyl-6,7-dimethyl
2-formyl-6,7-di-n-butyl
2-acetyl
2-methyl-3-(α-butoxyethyl)
2-methyl-3-(β-methoxyethyl)
2,3,6,7,8-pentamethyl-3-hydroxymethyl
2-formyl-5,6,7,8-tetramethyl
2-formyl-3,5-dimethyl
3-formyl-2,5-dimethyl
2-formyl-3,6-dimethyl
3-formyl-2,6-dimethyl
2-formyl-5-methyl-6-ethyl
2-formyl-5-isopropyl
2-formyl-6-propyl
2,3-diacetoxymethyl
2,3-dibutyryloxymethyl
2-methyl-3-formyloxy
2,3-diacetoxymethyl-6,7-dimethyl
2-amyl-3-butyryloxymethyl
2-methyl-3-hydroxymethyl-5-t-butyl
2-decyl-3-hydroxymethyl-6-methyl
2,3,5,6,7,8-hexamethyl
2-butyryl
2-methyl-3-(α-acetoxyethyl)
2-methoxymethyl

TABLE II.—PARENTERAL ADMINISTRATION

| Test No. | Quinoxaline di-N-oxide | Dose, mg./Bird | Dose, mg./kg. | Lesion Score [e] | Percent Deaths | Feed Consumption/Lot Post-Inj. | Wt. (g.)/Bird Gain (g.) |
|---|---|---|---|---|---|---|---|
| F1 | Infected Control | | | 4.0 | 30 | 1,476 | [t] −33.0 |
| 2 | 2,3-dimethyl | 10 | | 0.7 | 0 | 2,682 | 153.1 |
| 3 | ----do---- | 5 | | 0.6 | 0 | 2,471 | 142.0 |
| 4 | ----do---- | 2.5 | | 2.2 | 0 | 1,964 | 68.5 |
| 5 | ----do---- | 1.25 | | 2.9 | 10 | 1,627 | 44.6 |
| 6 | 2-methyl-3-hydroxymethyl | 10 | | 0.4 | 0 | 2,740 | 204.5 |
| 7 | ----do---- | 5 | | 1.2 | 0 | 2,465 | 177.0 |
| 8 | ----do---- | 2.5 | | 2.5 | 0 | 2,015 | 142.0 |
| 9 | ----do---- | 1.25 | | 2.8 | 0 | 1,810 | 121.0 |
| 10 | ----do---- | 20 | | 0.6 | 0 | 1,696 | 188.0 |
| G-1 | Infected Control | | | 3.33 | 45 | 621 | 60.8 |
| 2 | 2-methyl | 10 | 37.7 | 0.8 | 0 | 1,319 | 107.9 |
| 3 | ----do---- | 5 | 20.1 | 0.9 | 0 | 1,356 | 112.8 |
| 4 | ----do---- | 2.5 | 9.6 | 2.8 | 10 | 1,127 | 86.1 |
| 5 | 2,3-dihydroxymethyl | 10 | 41.2 | 0.3 | 0 | 1,562 | 140.7 |
| 6 | ----do---- | 5 | 22.0 | 0.3 | 0 | 1,530 | 134.0 |
| 7 | ----do---- | 2.5 | 11.1 | 0.9 | 0 | 1,425 | 100.7 |
| 8 | ----do---- | 1.25 | 5.3 | 2.0 | 0 | 1,371 | 105.6 |
| H-1 | Infected control | | | 3.37 | 36.7 | 657 | 57.4 |
| 2 | 2,3-dihydroxymethyl | 10 | 42.6 | 0.8 | 0 | 1,520 | 112.0 |
| 3 | ----do---- | 5 | 20.4 | 1.1 | 0 | 1,608 | 119.6 |
| 4 | ----do---- | 2.5 | 10.6 | 0.7 | 0 | 1,471 | 116.8 |
| 5 | 2-formyl | 10 | 41.5 | 0.7 | 0 | 1,622 | 112.8 |
| 6 | ----do---- | 5 | 20.6 | 1.7 | 0 | 1,387 | 99.6 |
| 7 | ----do---- | 2.5 | 12.7 | 2.5 | 10 | 1,162 | 77.3 |
| 8 | 2-methyl-3-acetoxymethyl | 10 | 45.2 | 1.2 | 0 | 1,544 | 102.7 |
| 9 | ----do---- | 2.5 | 9.8 | 2.1 | 0 | 1,419 | 86.7 |
| I-1 | Infected control | | | 3.5 | 40 | 496 | [t] −1.0 |
| 2 | 2-methyl-3-hydroxymethyl | 10 | 23.9 | 1.5 | 0 | 1,722 | 100.3 |
| 3 | ----do---- | 5 | 13.3 | 1.9 | 0 | 1,623 | 100.8 |
| 4 | ----do---- | 2.5 | 6.9 | 1.9 | 0 | 1,411 | 72.3 |

[e] Air sac lesion score 4 days post-injection. Three-week old chickens are used in tests G-1 to H-9. Four-week old chickens are used in tests I-1 to I-4.
[t] Loss.

All compounds are effective in reducing mortality, lesion scores and in increasing body weight and feed consumption. Effective control of the coliform infection is realized.

EXAMPLE IV

The procedure of Example II is repeated using the following quinoxaline-di-N-oxides at levels of 1.25, 2.5, 5 and 10 mg./bird, corresponding to from about 5 to about 50 mg./kg. body weight.

2-amyl-3-methyl
2,3-di-n-propyl
2,3,6-trimethyl
2,3,6,7-tetramethyl
2,6,7-trimethyl
2-decyl
2-formyl-6,7-di-n-butyl
2,3-diacetoxymethyl
2,3-dibutyryloxymethyl
2-methyl-3-formyloxy
2-(α-hydroxyethyl)
2,3-di(α-hydroxyethyl)
2,3-di(α-acetoxyethyl)
2-(α-hydroxypropyl)
2-(α-acetoxypropyl)
2-(α-hydroxybutyl)
2-(α-propoxypropyl)
2,3-diformyl
2,3-diformyl-6,7-dimethyl
2-(α-hydroxyisopropyl)
2,3-dimethoxymethyl
2,3-dibutoxymethyl
2,3,5,6,7,8-hexamethyl
2-amyl-3-butyryloxymethyl
2-methyl-3-hydroxymethyl-5-t-butyl
2-formyl-3,6-dimethyl
3-formyl-2,5-dimethyl
2-acetyl-3-methyl
2-decyl-3-acetyl
2-propionyl-3-propyl
2-formyl-3-acetoxymethyl
2-acetyl-3,6-dimethyl
2-(α-acetoxyethyl)
2-decyl-3-(α-hydroxyethyl)
2-amyl-3-(α-butyryloxybutyl)
2,6-dimethyl-3-(α-hydroxyethyl)
2-ethyl-6,7-di-n-butyl-3-(α-hydroxyethyl)
2,3-di(α-propoxypropyl)
2-(α-butoxymethyl)
2,3-diformyl-6-methyl
2,3-diformyl-5,6,7,8-tetramethyl
2-(α-acetoxyisopropyl)
2,5,6,7,8-pentamethyl-3-methoxymethyl
2-ethyl-3-(α-ethoxyethyl)

EXAMPLE V

Four-week-old turkey poults are infected with coliform air sacculitis by injecting 0.25 ml. of a 24-hour broth culture containing 2 different antibiotic (tetracycline) resistant avian pathogenic strains of *E. coli* into the left posterior thoracic air sac. Ten birds are used in each test. The medicated feed containing 0.05% of the quinoxaline di-N-oxide is administered ad libitum. Pertinent data are recorded below. There were no deaths among the medicated birds and 1 death in the control lot.

TABLE III.—ORAL ADMINISTRATION TO TURKEY POULTS

| Test No. | Quinoxaline Di-N-Oxide | Percent Feed | Replicates | Lesion Score | Feed Consumption/Lot | Avg. Gain/Bird, (g.) |
|---|---|---|---|---|---|---|
| T-1 | Infected control | | 2 | 3.05 | 2,296 | 111.9 |
| T-2 | 2,3-dimethyl | 0.05 | 3 | 0.47 | 2,850 | 166.0 |

EXAMPLE VI

The effectiveness of the compounds of Table IV against coliform air sacculitis in turkeys by subcutaneous injection is demonstrated as follows.

Nine-week old turkeys are inoculated into the left posterior thoracic air sac with 0.5 ml. of a 24-hour broth culture containing two different antibiotic (tetracycline) resistant avian pathogenic strains of E. coli. The compound under test is administered as an aqueous solution by subcutaneous injection at the rate of 20 mg./kg. body weight into the upper cervical region at the time of E. coli infection. Ten birds are used in each test.

TABLE IV.—SUBCUTANEOUS ADMINISTRATION TO TURKEYS

| Test No. | Quinoxaline di-N-Oxide | Lesion Score | Avg. Wt. Gain/Bird (g.) |
|---|---|---|---|
| T-3 | 2,3-dimethyl | 1.4 | 244.0 |
| T-4 | 2-methyl-3-hydroxymethyl | 1.2 | 264.5 |
| T-5 | 2,3-dihydroxymethyl | 1.3 | 205.0 |
| T-6 | 2-methyl | 1.3 | 197.5 |
| T-7 | 2-formyl | 1.3 | 155.5 |
| T-8 | Infected control | 2.7 | [1] −15.6 |

[1] Loss.

Here again, as in the preceding examples, effective control of the infection is noted. The lesion scores are reduced to approximately half of the control lot score and substantial weight gains are realized compared to a weight loss for the control birds.

EXAMPLE VII

The relative efficacy of the quinoxaline-di-N-oxides against Salmonella typhimurium infection in chicks is demonstrated by the following data. Two-week old chicks, divided into groups of 5 birds, are exposed to S. typhimurium by intramuscular injection of 0.25 ml. of an 18-hour culture. The test compound is administered in the basal feed at a level of 0.05% for five consecutive days starting two days prior to exposure. At the end of the five-day period non-medicated basal feed is provided until termination of the experiment on the eighth day following the challenge. Five birds are used as control birds and administered no medication at all. Five replicates of each test are run.

EXAMPLE VIII (A) The relative efficacy of the quinoxaline-di-N-oxides against Mycoplasma gallisepticum infection in chicks is demonstrated by the following data. Six-week old chicks, divided into groups of 10 birds, are exposed to the Mycoplasma infection by injection of 0.5 ml. of a 72-hour broth culture, diluted with an equal volume of sterile heart infusion broth into the left posterior thoracic air sac. The test compound is administered in the basal feed at a level of 0.05%. Medication is started 48 hours before exposure and continued for 72 hours post exposure for a total of 5 days medication. Two replicates of each test are run.

TABLE VI.—EFFICACY OF QUINOXALINE-DI-N-OXIDES (0.05%) v. M. GALLISEPTICUM [1]

| Test No. | Quinoxaline-di-N-Oxide | Lesion Score |
|---|---|---|
| K-1 | Infected Control | 2.15 |
| 2 | 2,3-dimethyl | 1.60 |
| 3 | 2,3-dihydroxymethyl | 1.10 |

[1] All values reported are average values.

(B) Repetition of procedure A but using 0.055% of the test compounds tabulated below produces the following significant reductions in lesion score.

TABLE VII.—EFFICACY OF QUINOXALINE-DI-N-OXIDES (0.055%) v. M. GALLISEPTICUM [1]

| Test No. | Quinoxaline-di-N-Oxide | Lesion Score | Test No. | Quinoxaline-di-N-Oxide | Lesion Score |
|---|---|---|---|---|---|
| L-1 | Infected Control | 2.13 | L-5 | 2,3-diacetoxymethyl | 1.68 |
| 2 | 2-methyl | 1.68 | 6 | 2-acetoxymethyl | 1.68 |
| 3 | 2,3-dimethyl | 1.00 | 7 | 2-methyl-3-hydroxymethyl | 1.56 |
| 4 | 2,3-dihydroxymethyl | 1.08 | 8 | 2-methyl-3-acetoxymethyl | 1.36 |

[1] All values reported are average values.

The Mycoplasma infection alone exerts a pronounced effect on the lesion score. Significant improvement of this characteristic reaction is obtained with these compounds and with the remaining compounds of this invention.

Similar results are obtained when this procedure is repeated but using N-type PPLO as the infecting organism.

EXAMPLE IX

The effectiveness of the quinoxaline-di-N-oxides described herein against naturally occurring chronic respiratory disease is demonstrated by the following experiment. Two-week old broiler chicks, divided into five groups of 10 birds, are fed a basal diet containing a quinoxaline-di-N-oxide at levels of 0.0125%, 0.025%, 0.05% and 0.10%, respectively. One group is used as control and administered no medication at all. The medicated rations are fed continuously to the chicks for two weeks at the end of which time five birds, naturally in- TABLE V.—RELATIVE EFFICACY OF QUINOXALINE DI-N-OXIDES ON S. TYPHIMURIUM INFECTIONS IN 2-WEEK OLD CHICKS

| Test No. | Quinoxaline-di-N-Oxide | Birds | Percent Mortality | Pre-Exp. | Post-Exp. | Total | Index | Weight Gain/Bird | |
|---|---|---|---|---|---|---|---|---|---|
| | | | | | | | | Grams | Index |
| J-1 | Non-infected control | 25 | 0 | 338 | 592 | 930 | 100 | 231.2 | 100 |
| J-2 | Infected control | 25 | 100 | 320 | 21 | 324 | 34.8 | | |
| J-3 | 2-methyl | 25 | 0 | 313 | 415 | 728 | 78.3 | 179.2 | 77.5 |
| J-4 | 2,3-dimethyl | 25 | 4 | 337 | 286 | 623 | 67.0 | 117.1 | 50.6 |
| J-5 | 2,3-dihydroxymethyl | 25 | 0 | 328 | 319 | 642 | 69.0 | 148.8 | 64.4 |
| J-6 | 2-formyl | 25 | 0 | 351 | 349 | 700 | 75.3 | 138.4 | 59.8 |
| J-7 | 2-methyl-3-acetoxy-methyl | 25 | 4 | 329 | 330 | 659 | 70.8 | 168.3 | 72.9 |
| J-8 | 2-methyl-3-hydroxymethyl | 25 | 0 | 308 | 325 | 633 | 68.1 | 142.0 | 61.4 | fected with chronic respiratory disease, and aerologically positive, are introduced into each of the test groups. The medicated feed is administered to each of the groups until termination of the test ten days after exposure. The chickens are checked as to mortality, weight gain and after sacrifice for air sac lesions.

Using the following compounds: 2,3-dimethyl-, 2,3-dihydroxymethyl-, 2-formyl-, 2-methyl-3-hydroxymethyl-, 2-methyl-3-acetoxymethyl-, 2-methyl-, 2,3-diacetoxymethyl-, 2-($\alpha$-hydroxyethyl)-, 2-formyl-3,6-dimethyl-, 2-decyl-3-acetyl-, 2,3,6-trimethyl- and 2,3-diformyl quinoxaline-di-N-oxide significant reduction in the air sac lesion score, and no deaths, are observed in the premedicated chicks.

containing two different antibiotic (tetracycline) resistant avian pathogenic strains of *E. coli*; to New Castle Virus (NCV) by intramuscular injection of 0.2 ml. of Roakin strain of New Castle Virus. Each of the six groups is subjected to atmospheric temperatures.

The drug is administered orally in the feed at a level of 200 gms./ton of feed for five successive days starting on the seventh day following challenge. Clinical signs of disease are present 72 hours following Mycoplasma exposure and by seven days post-exposure the disease was generalized and well established.

The challenge exposure, treatment and results are summarized below.

| Group | PPLO | NCV | E. coli | Drug | Percent Mortality | Lesion Score | Average wt. Gain/Bird, g. | Index |
|---|---|---|---|---|---|---|---|---|
| 1 | – | – | – | – | 0 | 0 | 652.3 | 100 |
| 2 | + | – | – | – | 2.0 | 2.02 | 504.7 | 76.3 |
| 3 | + | – | – | + | 0.7 | 1.16 | 482.2 | 84.2 |
| 4 | + | + | + | – | 3.3 | 1.79 | 499.2 | 76.1 |
| 5 | + | + | – | + | 1.3 | 1.53 | 508.4 | 82.3 |
| 6 | + | + | + | + | 0 | 1.45 | 522.9 | 93.8 |

The premedicated chicks also showed weight gains of at least 25% over the control group.

It is also observed that the naturally infected birds fed the medicated diet during the ten-day period have lower air sac lesion scores and economically important weight gains relative to naturally infected birds given no medication.

EXAMPLE XI

The therapeutic activity of 2-methyl-3-hydroxymethyl-quinoxaline-di-N-oxide in the control of complicated chronic respiratory disease is demonstrated by the following experiment.

Thus, 2-methyl-3-hydroxymethylquinoxaline-di-N-oxide is effective against these challenges even though treatment is delayed for four days after clinical sign of disease is observed.

EXAMPLE XII

The procedure of Example XI is repeated but using three groups of 100 birds each, the protocols of Groups 1, 4 and 5, and 250 g./ton of 2-methyl-3-hydroxymethyl-quinoxaline-di-N-oxide. As the data below show, a significant reduction in air sac lesion score and marked weight gain in a nine-day observation period is realized.

| Group | | Drug | Percent Mortality | Lesion Score | Average wt. Gain/Bird, g. | Efficacy Index |
|---|---|---|---|---|---|---|
| 1 | Normal Control | – | 0 | 0 | 267.2 | 100 |
| 2 | Infected Control | – | 1 | 2.81 | 187.9 | 74.5 |
| 3 | Infected Medicated | + | 1 | 1.2 | 222.5 | 88.2 |

Nine hundred four-week old chickens are divided into six groups of 150 birds.

*Group 1*, a control group, is subjected to no infection and no medication.

*Group 2*, a control group, is exposed to *M. gallisepticum* infection and receives no medication.

*Group 3* is exposed to *M. gallisepticum* infection and receives medication.

*Group 4*, a control group, is exposed to *M. gallisepticum*, *E. coli*, and New Castle Virus and receives no medication.

*Group 5* is exposed to *M. gallisepticum*, *E. coli* and New Castle Virus and receives medication.

*Group 6* is exposed to *M. gallisepticum* and New Castle Virus and receives medication.

Exposure to Mycoplasma (PPLO) infection is accomplished by injecting 0.5 ml. of a 72-hour broth culture into the left posterior thoracic air sac; to *E. coli* by intranasal instillation of 0.1 ml. of a 24-hour broth culture

EXAMPLE XIII

The therapeutic activity of 2-methyl-3-hydroxymethyl-quinoxaline-di-N-oxide is further demonstrated by repetition of Example XI using the protocols of Groups 1, 4 and 5 with the following differences: each group comprised 100 birds, Groups 3 and 4 received the drug in their feed at a level of 250 mg./ton simultaneously with exposure to the challenge and for five successive days. Group 4 is further injected subcutaneously ("booster" dose) with 10 mg. of drug per bird at the time of exposure to the New Castle Virus and *E. coli* infection.

The challenge exposure, treatment and results are summarized below.

| Group | PPLO | NCV | E. coli | Drug | Percent Mortality | Lesion Score | Avg. Wt. Gain/Bird | |
|---|---|---|---|---|---|---|---|---|
| | | | | | | | 11-Day Period | Index |
| 1 | – | – | – | – | 0 | 0 | 312.6 | 100 |
| 2 | + | + | + | – | 2 | 3.13 | 201.7 | 65.36 |
| 3 | + | + | + | + | 0 | 2.09 | 296.8 | 83.16 |
| 4 | + | + | + | + | 0 | 1.69 | 271.8 | 85.31 |

The "booster" dose (Group 4) provides significant control of the lesion score but does not change appreciably the final results of the trial since there is little difference in the index between Groups 3 and 4.

EXAMPLE XIV

Three groups of 10 birds each are subjected to the following scheduled.

Group 1, a control group, receives no infection and no medication.

trols are reported. In each case, the control is assigned a value of 100%. An increase in performance for a given compound is then represented by a + value; e.g., +6.3% weight gain indicates an increase in weight amounting to 106.3% relative to 100% for the controls.

| Quinoxaline-di-N-Oxide | Supplementation, g./ton | Percent Above or Below Controls | | | |
|---|---|---|---|---|---|
| | | Weight | Feed Efficiency | Feed Consumption | Birds |
| 2-methyl-3-hydroxymethyl | 125 | +5.2 | +4.4 | +2.1 | Chicks. |
| Do | 125 | +6.3 | +6.7 | +2.1 | Poults. |
| Do | 125 | +8.9 | +7.1 | +2.1 | Chicks. |
| Do | 20 | +2.0 | −1.3 | +3.6 | Do. |
| 2-methyl | 125 | +3.3 | +3.8 | 0.0 | Do. |
| Do | 20 | +4.3 | −0.7 | +5.9 | Do. |
| 2,3-dimethyl | 125 | +6.0 | +5.0 | +1.0 | Do. |
| Do | 20 | +1.1 | 0.0 | +1.2 | Do. |
| 2,3-dihydroxymethyl | 125 | +5.0 | +4.3 | +1.0 | Do. |
| Do | 20 | +1.6 | −0.5 | +0.5 | Do. |
| 2-formyl | 125 | +2.0 | +4.6 | +0.5 | Poults. |
| Do | 20 | +2.8 | +1.9 | 0.0 | Chicks. |
| 2-methyl-3-acetoxymethyl | 125 | +3.3 | +1.1 | +2.1 | Do. |
| Do | 125 | +4.0 | +7.7 | +0.5 | Poults. |
| Do | 20 | +1.4 | +0.6 | −0.6 | Chicks. |
| 2,3-diacetoxymethyl | 125 | +7.2 | +4.8 | +2.6 | Do. |
| Do | 20 | +4.3 | +2.0 | +1.8 | Do. |
| Do | 20 | +2.0 | +1.2 | +0.5 | Do. |
| 2-acetoxymethyl | 125 | +5.6 | +2.8 | +2.9 | Do. |
| Do | 125 | +6.9 | +6.5 | +0.5 | Do. |
| Do | 20 | +2.1 | +4.9 | −2.1 | Do. |

Group 2, a control group, is exposed to E. coli and Mycoplasma infection and receives no medication.

Group 3 is exposed to E. coli and Mycoplasma infections and receives 2-methyl-3-hydroxymethyl-quinoxaline-di-N-oxide in the feed at a rate of 250 g./ton of feed, for 5 days starting one day before exposure.

Exposure to Mycoplasma (PPLO) is achieved by injecting 0.5 ml. of a 72-hour broth culture of Mycoplasma into the left posterior thoracic air sac. Exposure to E. coli is accomplished by injecting into the left posterior thoracic air sac simultaneously with PPLO exposure, 0.25 ml. of a $10^{-3}$ dilution of a 24-hour broth culture containing two different antibiotic resistant avian pathogenic strains of E. coli.

The challenge in this test, 0.5 ml. pure Mycoplasma culture and 0.25 ml. of $10^{-3}$ dilution E. coli culture favored establishment of a predominant Mycoplasma infection.

Pertinent data demonstrating the value of this drug is given below.

| Group | | Percent Mortality | Lesion Score | Avg. Wt. Gain Per Bird, g. | Index |
|---|---|---|---|---|---|
| 1 | Non-infected control | 0 | 0 | 118.3 | 100 |
| 2 | Infected, non-medicated control | 0 | 1.7 | 101.3 | 82.21 |
| 3 | Infected, medicated 250 g./ton feed | 0 | 1.5 | 108.3 | 91.52 |

EXAMPLE XV

The efficacy of several of the herein described quinoxaline-di-N-oxides in improving broiler chick and turkey poult performance is summarized in the following table. Supplementation of the rations with said compounds at levels of 20 and 125 g./ton brought about economically significant gains in growth and feed efficiency.

The experimental birds and dietary treatments are assigned pens in accordance to randomized block designs. Each observation reported is an average of 6 pen replications, each pen containing 10 birds. The experiments are conducted in battery brooders for from 1 to 28 days of bird age. Controls are run using, of course, unsupplemented rations. For convenience in reporting results the percent change in the weight, feed efficiency and feed consumption over the corresponding values for the con-

EXAMPLE XVI

In further tests the compounds of Example XV are added to the standard balanced animal feed compositions normally given sheep, steer, goats, dogs and mink at levels of from 10, 20, 50, 100 and 125 g./ton of feed. Each species is observed to undergo accelerated growth, particularly at the lower levels of supplement used.

What is claimed is:

1. A method for the treatment of chronic respiratory disease infected poultry which comprises administering to said infected poultry an effective amount of a compound selected from the group consisting of those having the formulae

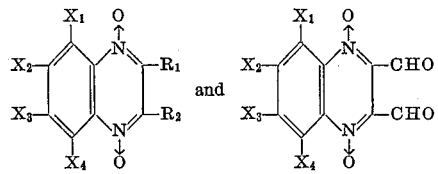

wherein $R_1$ is selected from the group consisting of hydrogen, alkyl of up to 10 carbon atoms, α-hydroxy lower alkyl, α-lower alkanoyloxy lower alkyl, and α-lower alkoxy lower alkyl;

$R_2$ is selected from the group consisting of alkyl of up to 10 carbon atoms, lower alkanoyl, α-hydroxy lower alkyl, α-lower alkanoyloxy lower alkyl, and α-lower alkoxy lower alkyl; and $X_1$, $X_2$, $X_3$, and $X_4$ are each selected from the group consisting of hydrogen and lower alkyl.

2. The method of claim 1 wherein the compound is administered orally at a dosage level of from about 1 mg./kg. to about 60 mg./kg. of body weight.

3. The method of claim 1 wherein the compound is administered parenterally at a dosage level of from about 10 mg./kg. to about 100 mg./kg. of body weight.

4. A method for the control of chronic respiratory disease of poultry which comprises the administration to said poultry of from about 1 mg./kg. to about 60 mg./kg. of body weight of 2-methyl-3-hydroxymethylquinoxaline-di-N-oxide.

5. A method for preventing chronic respiratory disease infection of healthy poultry, while promoting growth and improving feed efficiency thereof, which comprises administering to said healthy poultry an effective amount of a compound selected from the group consisting of those having the formulae:

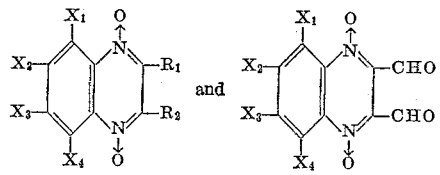

wherein $R_1$ is selected from the group consisting of hydrogen, alkyl of up to 10 carbon atoms, α-hydroxy lower alkyl, α-lower alkanoyloxy lower alkyl, and α-lower alkoxy lower alkyl;

$R_2$ is selected from the group consisting of alkyl of up to 10 carbon atoms; lower alkanoyl, α-hydroxy lower alkyl, α-lower alkanoyloxy lower alkyl, and α-lower alkoxy lower alkyl; and $X_1$, $X_2$, $X_3$, and $X_4$ are each selected from the group consisting of hydrogen and lower alkyl.

6. The method of claim 5 wherein the compound is administered orally.

7. The method of claim 5 wherein the compound is administered parenterally.

8. The method of claim 5 wherein the compound is 2-methylquinoxaline-di-N-oxide.

9. The method of claim 5 wherein said compound is 2,3-dimethylquinoxaline-di-N-oxide.

10. The method of claim 5 wherein said compound is 2-methyl-3-hydroxymethylquinoxaline-di-N-oxide.

References Cited
UNITED STATES PATENTS

| | | | |
|---|---|---|---|
| 2,545,786 | 3/1951 | Landquist | 260—251 |
| 2,626,259 | 1/1953 | Landquist et al. | 260—250 |
| 2,644,000 | 6/1953 | Landquist | 260—250 |
| 2,890,981 | 6/1959 | Ursprung | 167—53 |
| 2,921,937 | 1/1960 | Gordon et al. | 260—267 |
| 3,080,283 | 3/1963 | Bijloo et al. | 167—53 |

SAM ROSEN, *Primary Examiner.*